(12) United States Patent
Euteneuer et al.

(10) Patent No.: US 7,583,435 B2
(45) Date of Patent: Sep. 1, 2009

(54) TUBE FOR A MICROSCOPE

(75) Inventors: Peter Euteneuer, Lahnau (DE); Klaus Hermanns, Asslar (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 140 days.

(21) Appl. No.: 10/589,279

(22) PCT Filed: Jan. 24, 2005

(86) PCT No.: PCT/EP2005/050288

§ 371 (c)(1),
(2), (4) Date: Aug. 11, 2006

(87) PCT Pub. No.: WO2005/078504

PCT Pub. Date: Aug. 25, 2005

(65) Prior Publication Data

US 2007/0183028 A1    Aug. 9, 2007

(30) Foreign Application Priority Data

Feb. 12, 2004  (DE) .................. 10 2004 006 937

(51) Int. Cl.
   *G02B 21/00* (2006.01)
(52) U.S. Cl. .................. 359/384; 359/433; 359/434
(58) Field of Classification Search .................. 359/384
See application file for complete search history.

(56) References Cited

U.S. PATENT DOCUMENTS

| 2,132,122 | A | * | 10/1938 | Ott .............................. 359/384 |
| 4,175,826 | A | * | 11/1979 | Blaha et al. .................. 359/377 |
| 4,691,997 | A | | 9/1987 | Muchel |
| 4,798,451 | A | * | 1/1989 | Fujiwara ...................... 359/375 |
| 4,991,947 | A | | 2/1991 | Sander et al. |
| 5,552,929 | A | | 9/1996 | Fukaya et al. |
| 5,657,158 | A | | 8/1997 | Baumann et al. |
| 2001/0030801 | A1 | | 10/2001 | Kawasaki |
| 2004/0141231 | A1 | | 7/2004 | Hund et al. |
| 2004/0190128 | A1 | | 9/2004 | Hund et al. |
| 2004/0240048 | A1 | * | 12/2004 | Dietrich et al. ............. 359/368 |

FOREIGN PATENT DOCUMENTS

| DE | 35 08 306 C2 | 9/1986 |
| DE | 195 13 870 A1 | 10/1996 |
| DE | 103 00 455 A1 | 7/2004 |
| DE | 103 00 456 A1 | 7/2004 |
| EP | 0 363 762 B1 | 4/1990 |
| EP | 0 844 505 A2 | 5/1998 |
| WO | WO03/003099 A2 * | 1/2003 |

* cited by examiner

*Primary Examiner*—Lee Fineman
(74) *Attorney, Agent, or Firm*—Foley & Lardner LLP

(57) ABSTRACT

The application relates to an ergonomic tube for a microscope. A binocular head is provided on the tube. A deflection element is provided in the tube and a deflection mirror is assigned to the element, the mirror being located behind the optical path of the lens, when viewed from the user's position. A single tube-lens system is positioned in the optical path of the tube. A modification to the inclination of the oclar optical path in relation to the horizontal (H) by a value α causes the position of the deflection mirror to be modified by an angle α/2.

16 Claims, 5 Drawing Sheets

TUBE FOR A MICROSCOPE

Figure 1:
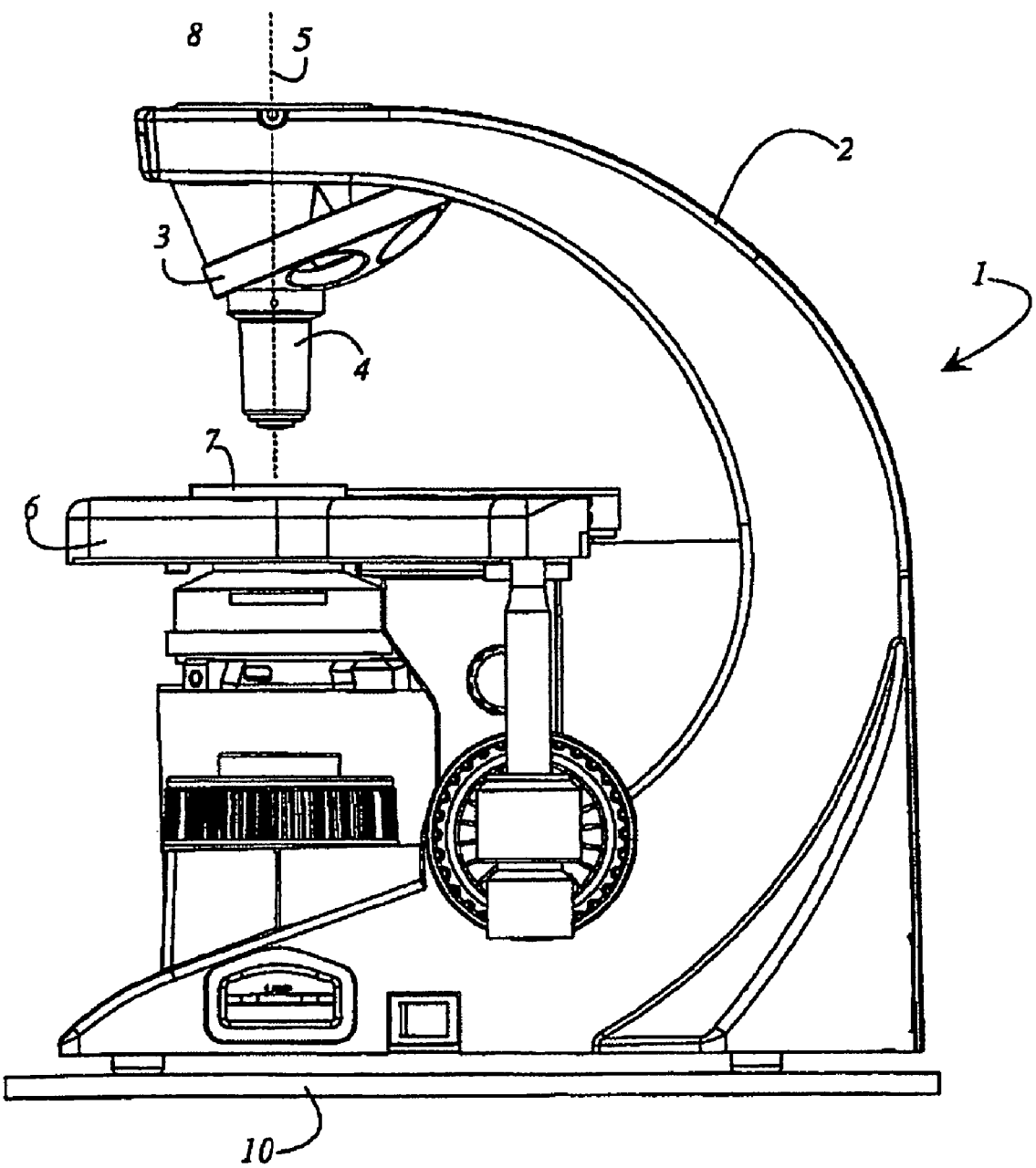

The present invention relates to a tube for a microscope. In particular, the invention relates to a tube for a microscope with an objective defining an objective optical path, the tube defining a tube optical path, a binocular head provided on the tube defining an ocular optical path, a deflection element being provided in the tube optical path, whereby a deflection mirror is provided behind the objective optical path, when viewed from the user's position.

European Patent Application EP-0 844 505 discloses a variable-inclination-angle tube. The tube consists of an eyepiece and a mirror being positioned so that it rotates about half of the angle when the ocular view is pivoted by a predetermined angle. The optical construction of the tube itself is complicated, requires an extensive adjustment, and is not cost-efficient.

German Patent Application DE 103 00 455.6 discloses a tube for adaptation to a microscope. An adaptation interface, a rotatable operator interface, a beam-deflecting unit, and a rotatable beam-deflecting unit are provided. The beam-deflecting device deflects a light beam coming from the adaptation interface in the direction of the rotatable beam-deflecting unit. A rotation of the operator interface is thereby constrainedly coupled with a rotation of the rotatable beam-deflecting unit. The beam-deflecting unit further includes a beam-splitting assembly.

German Patent Application DE 103 00 456.4 discloses a tube for adaptation to a microscope with a tube housing, an adaptation interface, a beam-deflecting unit, further beam-guiding devices, and an operator interface. The beam-deflecting unit can deflect a light beam coming from the adaptation interface so that the optical axis of the light beam essentially extends in a predetermined plane, at least in certain areas, and is guided to the operator interface by the further beam-guiding devices. A relative movement of the tube housing, including the further beam-guiding devices, and the operator interface to the microscope is provided in a direction parallel to the predetermined plane. This system is mechanically complicated and expensive.

German Laid-open Application DE 35 08 306 A1 discloses a microscope tube. The tube allows for the placing of attachments. Provided is a first concave deflection mirror and a second deflection mirror that couples the light from the observation optical path into the eyepieces. The second deflection mirror is positioned closer towards the eyepieces. In other words, the second deflection mirror is positioned behind the optical axis of the observation optical path. The deflection of the optical path is relatively complicated and cannot be easily adjusted.

The present invention is thus based on the object of disclosing a tube that can change the viewing angle or that has a fixed ergonomic viewing angle. Furthermore, it is to be considered that the binocular head is attached at the tube so that an ergonomic operation of the operating elements of the microscope is possible. Additionally, the number of the reflections in the tube is not to exceed two.

The microscope of the above-identified type solves the preceding object. Such a microscope may comprise a tube for a microscope with an objective defining an objective optical path, the tube defining a tube optical path. a binocular head provided at the tube defining an ocular optical path. a deflection element being provided in the tube optical path. whereby a deflection mirror is provided behind the objective optical path, when viewed from the user's position, wherein a single tube-lens system is positioned in the tube optical path and in that a modification to the inclination of the ocular optical path in relation to the horizontal by a value a causes the position of the deflection mirror to be modified by an angle $\alpha/2$. The tube may also comprise a binocular head with an adjustable range of the angle a between the horizontal and the ocular optical path of slightly over 0° and 32.50. or more particularly where the adjustable range of the angle a preferably lies between 7.5° and 32.5°.

It is particularly cost- efficient, adjustment-friendly, and ergonomic when a single tube-lens system is positioned in the tube optical path and that a modification to the inclination of the ocular optical path in relation to the horizontal by a value α causes the position of the deflection mirror to be modified by an angle $\alpha/2$.

The single tube-lens system is positioned at the microscope in the region of a connection element in front of the deflection element. The binocular head has two eyepieces, whereby an intermediate image is created in each of the eyepieces. The distance from a lens vertex of the single tube-lens system to the intermediate image is not greater than 1.25 times the focal distance of the tube-lens system.

Two embodiments have proven to be particularly advantageous. The first embodiment has a pivotable binocular head. The pivoting movement of the binocular head is thereby constrainedly coupled with the pivoting movement of the deflection mirror. The constrained coupling between the deflection mirror and the binocular head is embodied so that the deflection mirror pivots by an angle value $\alpha/2$ when the binocular head is pivoted by the value α.

In the second embodiment, the deflection mirror and the binocular head are firmly and unchangeably positioned. The angle α of the binocular head between the horizontal and the ocular optical path can be fixedly preset, preferably between 7.5° and 20.0°. This presetting takes place at the factory and cannot be changed by the user.

Further advantageous embodiments of the invention can be gathered from the subclaims.

Figure 2:
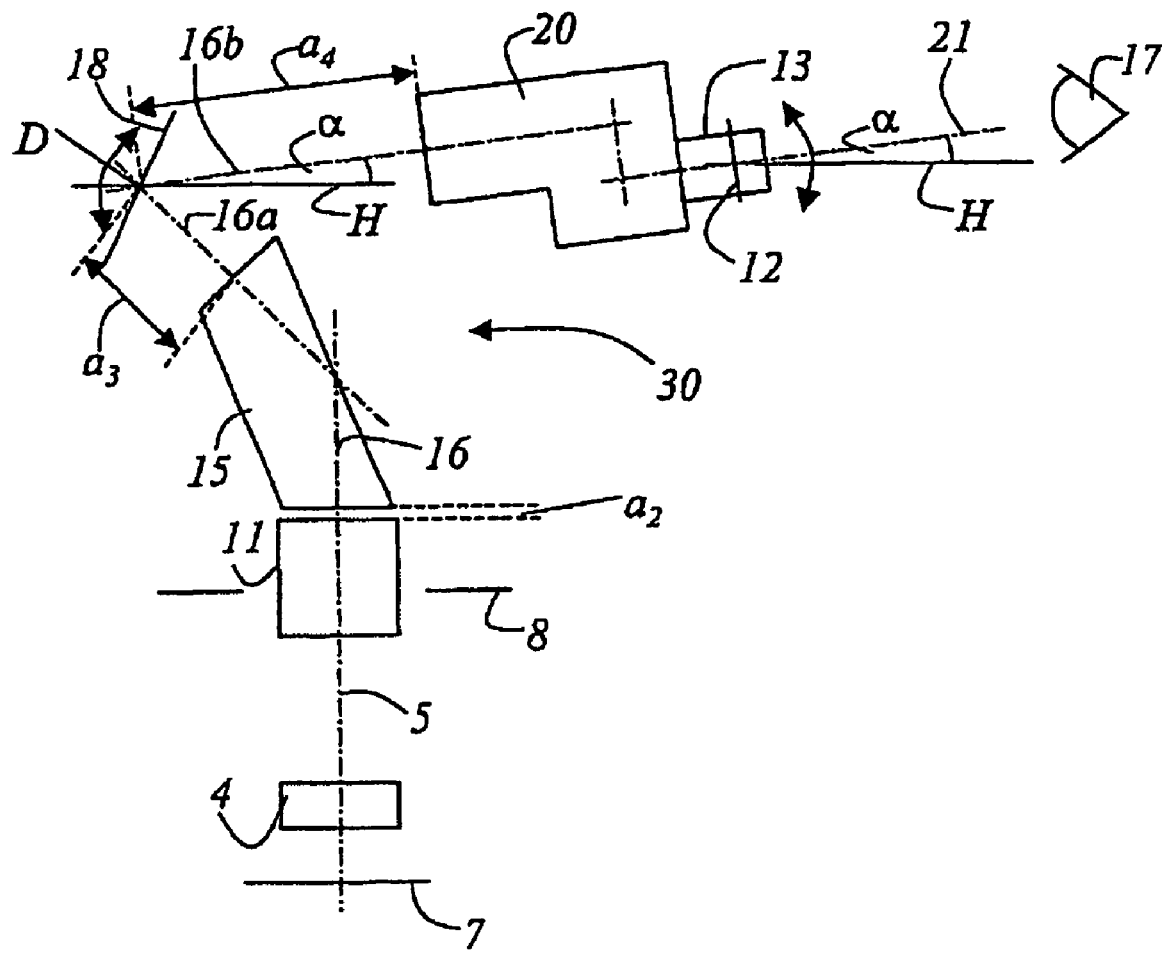
Figure 3:
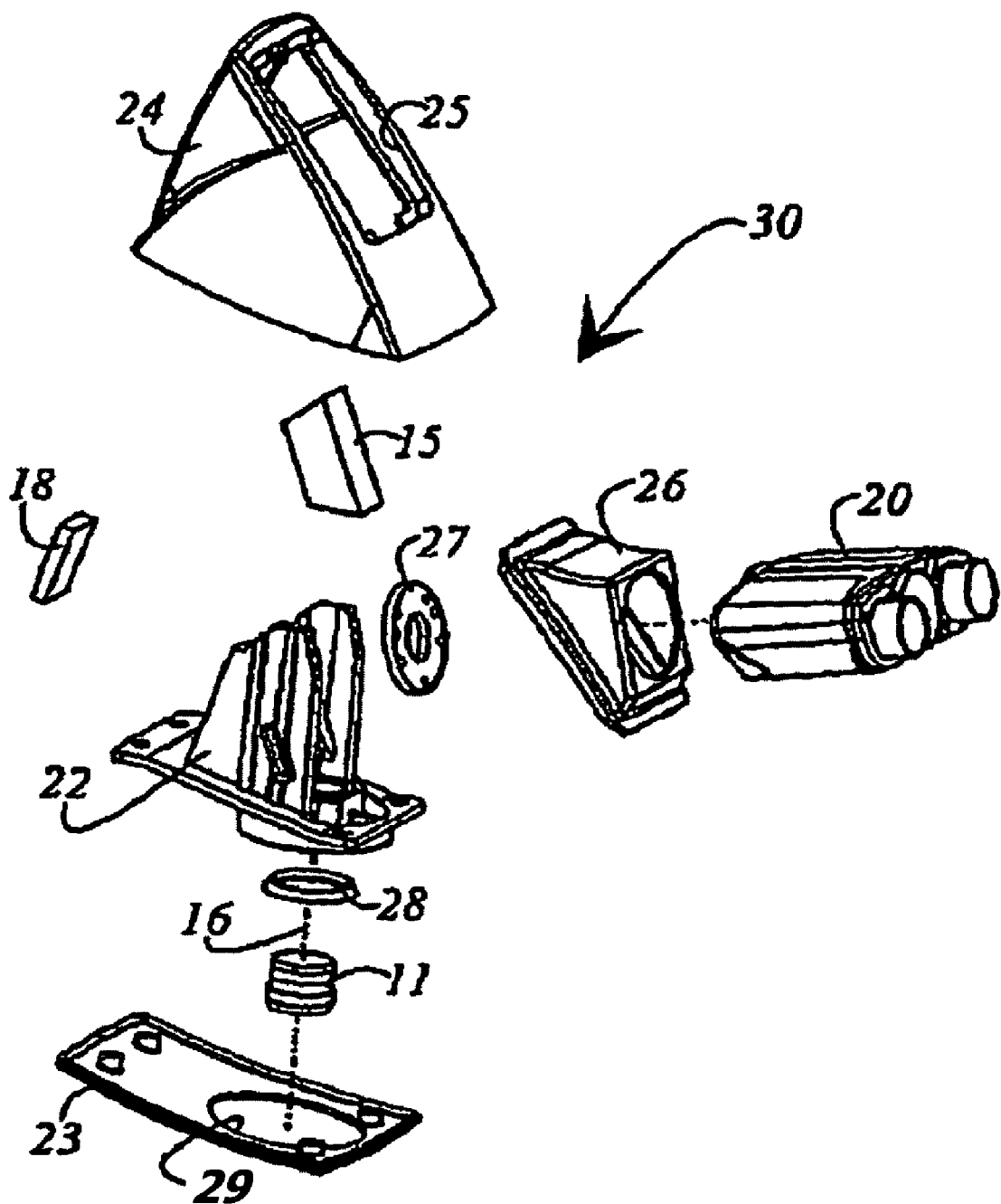
Figure 4:
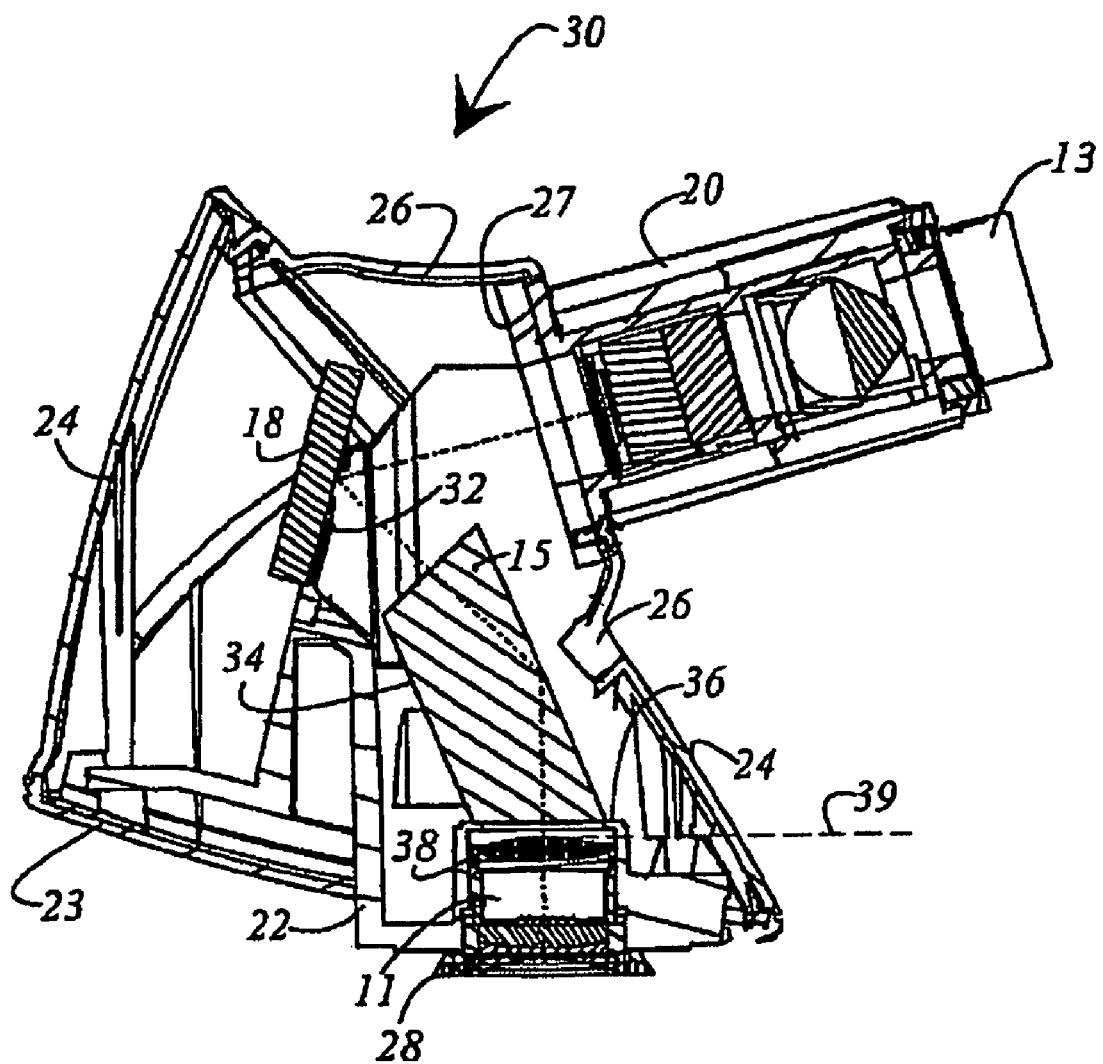
Figure 5:
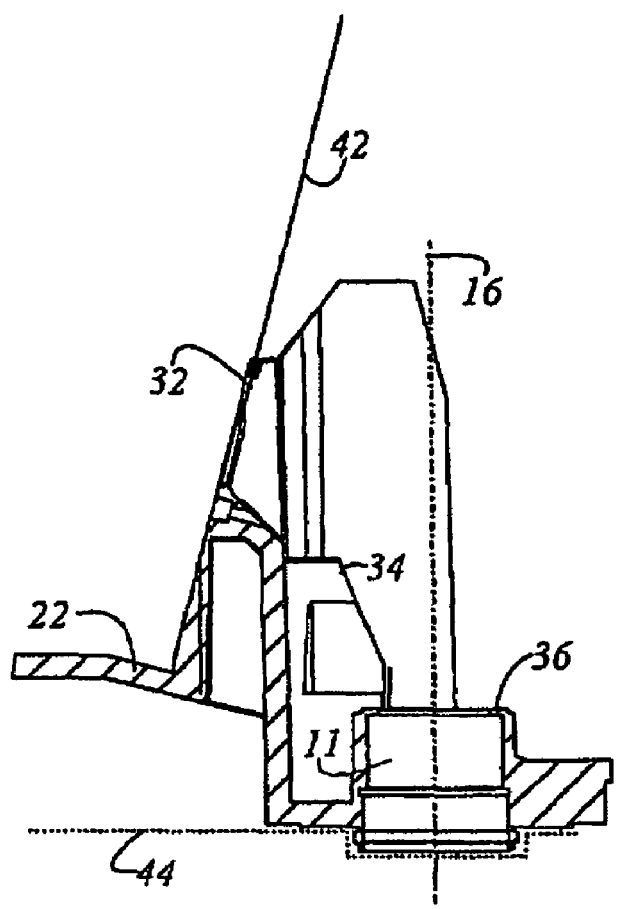

In connection with the explanation of the preferred exemplary embodiments of the invention by means of the drawing, preferred embodiments and developments of the teaching in general will be explained as well. The drawing shows in:

FIG. 1 a side view of a microscope to which the tube as claimed in the invention can be attached;

FIG. 2 a schematic illustration of the construction of the tube as claimed in the invention, whereby the exemplary embodiment of a rotatable deflection mirror is shown herein;

FIG. 3 a perspective exploded view of the tube as claimed in the invention for a fixed embodiment;

FIG. 4 a cross section through the tube with a mounted binocular head for a fixed embodiment;

FIG. 5 an illustration of the holding element; and

Figure 6:
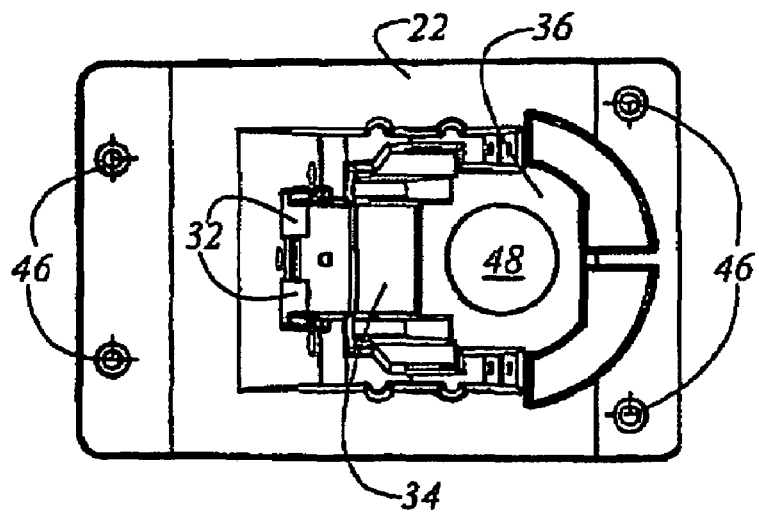

FIG. 6 a top view onto the holding element.

In FIGS. 1 to 6, the same or similar components are characterized with the same reference numeral.

FIG. 1 shows a side view of a microscope 1 to which the tube 30 as claimed in the invention (not illustrated herein) can be attached. The microscope 1 comprises a microscope tripod 2. The microscope 1 stands on a support 10. Furthermore, a revolver 3 carrying at least one objective 4 is provided on the microscope tripod 2. The revolver 3 can pivot the objective 4 into an operating position. The objective 4 has or defines, respectively, an optical axis 5 that, in the operating position of the objective 4, is located on a microscope table 6 in a vertical position. An object to be examined 7 is deposited on the microscope table 6. A connection element 8 for the tube 30 is provided on the top side of the tripod.

FIG. 2 shows a schematic illustration of the construction of the tube 30 as claimed in the invention, whereby the exemplary embodiment of a rotatable deflection mirror is illustrated herein. The tube 30 is also referred to as an ergonomic tube, as it can be adjusted or correspondingly pre-fabricated, depending on the different ergonomic requirements of the different users. The tube 30 can be attached to the different upright Leica tripods by means of the connection element 8. The light enters into the tube 30 through the connection element 8 infinitely coming from the objective 4 with image distance. The light disperses in the optical axis 5 or in the objective optical path. A one-piece, single, and compact tube-lens system 11 that, in its focal point, reproduces an intermediate image 12 into the ocular intermediate image of the two eyepieces 13, is located in the region of the connection element 8. The tube-lens system 11 defines a tube optical path 16.

An optical deflection element 15 that deflects the beam of the tube optical path 16 backwards, away from an observer 17, is located at a distance $a_2$ behind the single tube-lens system 11. The beam thus falls on a deflection mirror 18 that, together with the eyepiece 13, is pivotably embodied in this embodiment. The pivoting movement of the deflection mirror 18 and of the eyepiece 13 is constrainedly coupled. Furthermore, the deflection mirror 18 is positioned so that in any position of the deflection mirror 18, the angle between the incident beam 16a and the emergent beam 16b becomes greater than 90°. The distance $a_3$ between the optical deflection element 15 and the deflection mirror 18 is chosen so that yet another minimum viewing angle of 7.5°, measured from the horizontal H, can be realized without a shading of the emergent beam 16b taking place at the optical deflection element 15. Preferably, the deflection element 15 is embodied as a prism.

The pivotable deflection mirror 18 illustrated in this exemplary embodiment is located, with its reflecting surfaces, in the middle of a pivot axis D about which the entire binocular head 20 with the two eyepieces is pivoted. Due to the constrained coupling, the pivotable deflection mirror 18 is simultaneously pivoted with half of the angle speed of the binocular head 20.

The adjustment of the eye base of the two eyepieces 13 takes place as claimed in the "Siedentopf" principle.

For optical reasons (for avoiding vignettings), the distance from the last lens vertex of the compact tube-lens system 11 to the intermediate image 12 must be maintained as short as possible. The distance should not be greater than 1.25 times the focal distance of the tube-lens system 11. The single tube-lens system 11 is positioned in the tube optical path 16. Independent on the pivotability of the binocular head 20, the relationship of the configuration of the deflection mirror 18 and the binocular head 20 is such that a modification to the inclination of the ocular optical path 21 in relation to the horizontal H by a value a causes the position of the deflection mirror to be modified by an angle $\alpha/2$.

FIG. 3 shows a perspective exploded view of the tube 30 as claimed in the invention. In this embodiment, the deflection mirror 18 and the binocular head 20 are fixedly and unchangeably positioned. The angle a of the binocular head 20 between the horizontal H (see FIG. 2) and the ocular optical path 21 can be fixedly preset at the factory to, preferably, between 7.5° and 20.0°, depending on the customer preference. A holding element 22 is provided on which the deflection device 15 and the deflection mirror 18 are mounted. The holding element 22 is surrounded by a housing that consists of a lower housing part 23 and an upper housing part 24. The upper housing part 24 has a recess 25 into which a mounting part 26 for the binocular head 20 can be inserted. An adapter plate 27, on which, in turn, the binocular head 20 is attached, is attached at the holding element 22. A dovetail 28 that cooperates with the connection element 8 at the microscope 1 is provided at the underside of the holding element 22. The tube 30 is attached on the microscope 1 by the interaction of the dovetail 28 and the connection element 8. The lower housing part 23 has an opening 29 through which the dovetail 28 grips.

FIG. 4 discloses a cross section through the tube 30 with a mounted binocular head 20. The lower housing part 23, the upper housing part 24, and the mounting part 26 surround the holding element 22 on which the deflection mirror 18 and the deflection element 15 are attached. The deflection mirror 18 is mounted on a mounting surface 32 of the holding element 22. The deflection element 15 is mounted on at least two mounting surfaces 34 and 36 of the holding element 22. The deflection element 15 is glued into the holding element 22. In the exemplary embodiment of a tube 30 with a binocular head 20 having an unchangeable angle position, the deflection mirror 18 is glued to the mounting surface 32. The single tube-lens system 11 is also attached in the holding element 22 below the deflection element 15. The optical deflection element 15 is located behind the single tube-lens system 11, at a distance $a_2$ to an uppermost lens 38. The uppermost lens 38 defines a lens vertex 39, illustrated in FIG. 4 as a dashed line.

FIG. 5 is an illustration of the holding element 22. The tube-lens system 11 is attached in the holding element 22. The tube-lens system 11 defines the tube optical path 16. The holding element 22 embodies the mounting surfaces 34 and 36 on which the deflection element 15 is attached. The mounting surface 32 is embodied on the holding element 22 for the attachment of the deflection mirror 18. The position of the mounting surface 32 is illustrated in FIG. 5 by the solid line 42. The position of the microscope 1 in relation to the tube 30 is represented by the dotted line 44. The holding element 22 is cast, for example, from a metal and the mounting surfaces 32, 34, and 36 are treated in a separate operating step to achieve a precise mounting of the individual elements.

FIG. 6 shows a top view onto the holding element 22. The holding element 22 has a plurality of bores 46 that serve for the attachment of the lower housing part. The tube-lens system 11 is inserted into a recess 48 of the holding element 22. The mounting surface 36 is embodied around the recess 48. Likewise, the mounting surface 34 for the embodied deflection element 15 is embodied at the holding element 22. The deflection mirror 18 is mounted on the mounting surface 32.

In conclusion, it is particularly pointed out that the above-discussed exemplary embodiments only serve for the description of the claimed teaching, but do not limit the same to the exemplary embodiments.

LIST OF REFERENCE NUMERALS 1 microscope
2 microscope tripod
3 revolver
4 objective
5 optical axis
6 microscope table
7 object
8 connection element
10 support
11 tube-lens system
12 intermediate image
13 eyepieces
15 deflection element
16 tube optical path
17 observer
18 deflection mirror 20 binocular head
21 ocular optical path
22 holding element
23 lower housing part
24 upper housing part
25 recess
26 mounting part
27 adapter plate
28 dovetail
29 opening
30 tube
32 mounting surface
34 mounting surface
36 mounting surface
38 uppermost lens
39 lens vertex
42 solid line
44 dotted line
46 bores
48 recess
D pivot axis 10
H horizontal

The invention claimed is:

1. A tube for a microscope with an objective defining an objective optical path, the tube defining a tube optical path, a binocular head provided at the tube defining an ocular optical path, a deflection element being provided in the tube optical path, wherein the objective optical axis is positioned between a deflection mirror and the binocular head, without intersecting the deflection mirror,
   wherein a one-piece, single tube-lens system is positioned in the tube optical path and a modification to the inclination of the ocular optical path in relation to the horizontal by a value α causes the position of the deflection mirror to be modified by an angle α/2.

2. The tube as claimed in claim 1, wherein the single tube-lens system is positioned at the microscope in a region of a connection element in front of the deflection element.

3. The tube as claimed in claim 1, wherein the binocular head has two eyepieces, an intermediate image is configured to be created in each of the eyepieces and the distance from a lens vertex of the single tube-lens system to the intermediate image is not greater than 1.25 times the focal distance of the tube-lens system.

4. The tube as claimed in claim 1, wherein the deflection mirror and the binocular head are pivotably embodied and that the pivoting movement thereof is constrainedly coupled.

5. The tube as claimed in claim 4, wherein the constrained coupling between the deflection mirror and the binocular head is embodied so that the deflection mirror pivots by an angle value α/2 when the binocular head is pivoted by the angle α.

6. The tube as claimed in claim 5, wherein the deflection mirror defines a pivot axis that runs in the middle of a reflecting surface of the deflection mirror.

7. The tube as claimed in claim 4, wherein the binocular head has an adjustable range of the angle α between the horizontal and the ocular optical path of slightly over 0° and 32.5°.

8. The tube as claimed in claim 7, wherein the adjustable range of the angle α lies between 7.5° and 32.5°.

9. The tube as claimed in claim 1, wherein the deflection mirror and the binocular head are fixedly and unchangeably positioned.

10. The tube as claimed in claim 9, wherein the angle α of the binocular head between the horizontal and the ocular optical path can be fixedly preset to, between 7.5° and 20.0°.

11. The tube as claimed in claim 1, wherein a holding element is provided on which the deflection element and the deflection mirror are mounted.

12. The tube as claimed in claim 11, wherein the deflection element is a prism.

13. The tube as claimed in claim 11, wherein the holding element is surrounded by a housing comprising a lower housing part and an upper housing part.

14. The tube as claimed in claim 13, wherein the upper housing part has a recess into which a mounting part for the binocular head can be inserted.

15. The tube as claimed in claim 11, wherein the binocular head as well as the single tube-lens system are attached in or on the holding element.

16. The tube as claimed in claim 1, wherein the distance between the deflection element and the deflection mirror lies in the range of between 0.125 times and 0.150 times the focal distance of the single tube-lens system.

* * * * *